(12) United States Patent
Schnitzer

(10) Patent No.: US 8,453,986 B2
(45) Date of Patent: Jun. 4, 2013

(54) SOLAR PANEL MOUNT

(75) Inventor: Sandy Schnitzer, Rangsdorf (DE)

(73) Assignee: Mounting Systems GmbH, Rangsdorf (DE)

( * ) Notice: Subject to any disclaimer, the term of this patent is extended or adjusted under 35 U.S.C. 154(b) by 0 days.

(21) Appl. No.: 13/145,846

(22) PCT Filed: Jan. 21, 2010

(86) PCT No.: PCT/DE2010/000080
§ 371 (c)(1),
(2), (4) Date: Jul. 22, 2011

(87) PCT Pub. No.: WO2010/085939
PCT Pub. Date: Aug. 5, 2010

(65) Prior Publication Data
US 2011/0277402 A1    Nov. 17, 2011

(30) Foreign Application Priority Data
Jan. 27, 2009    (DE) .................... 20 2009 001 098 U

(51) Int. Cl.
*A47G 29/02* (2006.01)
(52) U.S. Cl.
USPC .......................... 248/237; 136/230; 126/623
(58) Field of Classification Search
USPC ............ 52/173.3, 582.1, 584.1, 653.1, 656.1, 52/654.1; 136/230, 251, 244; 126/623, 704; 248/910, 237, 346.01
See application file for complete search history.

(56) References Cited

U.S. PATENT DOCUMENTS

| 4,239,555 | A  * | 12/1980 | Scharlack et al. ............ 136/251 |
| 4,404,962 | A  * | 9/1983  | Zinn et al. .................... 126/676 |
| 5,497,587 | A  * | 3/1996  | Hirai et al. ................... 52/173.3 |
| 6,105,317 | A  * | 8/2000  | Tomiuchi et al. ............ 52/173.3 |
| 6,111,189 | A  * | 8/2000  | Garvison et al. ............. 136/244 |
| 6,959,517 | B2 * | 11/2005 | Poddany et al. ............. 52/173.3 |
| 7,155,870 | B2 * | 1/2007  | Almy ............................. 52/544 |
| 7,434,362 | B2 * | 10/2008 | Liebendorfer ............... 52/173.3 |
| 7,956,280 | B2 * | 6/2011  | Kobayashi .................... 136/251 |
| 8,122,648 | B1 * | 2/2012  | Liu ................................. 52/58 |
| 2003/0094193 | A1 * | 5/2003 | Mapes et al. ................. 136/244 |
| 2003/0101662 | A1 * | 6/2003 | Ullman ........................... 52/27 |
| 2004/0000334 | A1 * | 1/2004 | Ressler ......................... 136/251 |

(Continued)

FOREIGN PATENT DOCUMENTS

| EP | 1348915 A2 | 10/2003 |
| JP | 2000064515 A | 2/2000 |

(Continued)

OTHER PUBLICATIONS

International Preliminary Report on Patentability dated Aug. 2, 2011.

*Primary Examiner* — William Gilbert
*Assistant Examiner* — Babajide Demuren
(74) *Attorney, Agent, or Firm* — Patent Central LLC; Stephan A. Pendorf

(57) ABSTRACT

The invention relates to a solar module attachment, comprising a Z-support (2), the one Z-side (2.1) of which is used directly as a roof attachment or can be connected to roof hooks or support posts in the case of a mounting system, while clamps (5) can be displaced over the other Z-side (2.2), the attachment means engaging in said clamps in order to fix solar module frames (1).

9 Claims, 2 Drawing Sheets

U.S. PATENT DOCUMENTS

| | | | |
|---|---|---|---|
| 2004/0154655 A1* | 8/2004 | Tanaka | 136/244 |
| 2008/0087275 A1* | 4/2008 | Sade et al. | 126/623 |
| 2010/0154784 A1* | 6/2010 | King et al. | 126/623 |
| 2011/0247279 A1* | 10/2011 | Stearns et al. | 52/58 |
| 2012/0023838 A1* | 2/2012 | Stearns et al. | 52/97 |

FOREIGN PATENT DOCUMENTS

| | | |
|---|---|---|
| JP | 2000129868 A | 5/2000 |
| JP | 2001144314 A1 | 5/2001 |
| JP | 2003336357 A | 11/2003 |

* cited by examiner

SOLAR PANEL MOUNT

BACKGROUND OF THE INVENTION

1. Field of the Invention

The invention relates to a solar panel mount, in particular for the installation of framed solar panels on a roof.

2. Description of the Related Art

To install framed solar panels on a roof, supports arranged on roof hooks are normally used, which supports have a special profile to allow convenient connection of mounting means for the solar panel frames to the support.

Special profiles which can be produced by extrusion and adapted to the specific place of use and size of the solar panel by cutting them to the required length are particularly advantageous (e.g. EP 1 721 107 B1). The drawbacks of these special profiles are an unfavourable section modulus and second moment of area in relation to the large amount of material used. In addition, these special profiles usually comprise openings, allowing water and dust to accumulate; as a consequence, the profiles can be damaged due to freezing.

For this reason, DE 20 2006 009 871 U1 proposed e.g. to use a box-shaped profile to which mounting means can be click-fixed by means of clamping brackets which engage in grooves arranged on the outside of said profile.

BRIEF SUMMARY OF THE INVENTION

The object of the invention is to provide a material-saving standard profile for use as a support for solar panels.

The aforesaid object is achieved by means of the features defined in claim 1; advantageous configurations are set out in the sub-claims.

The solar panel mount according to the invention comprises a Z-shaped support, one Z leg of which is mounted directly to the roof or can be connected to roof hooks or upright posts in the case of a rack mounting solution while clamps can be slid onto the other Z leg and mounting means engage in said clamps to fix the solar panel frames in position.

BRIEF DESCRIPTION OF THE SEVERAL VIEWS OF THE DRAWINGS

The present invention is illustrated by way of example and not limitation in the accompanying drawings in which like reference numbers indicate similar parts, and in which.

DETAILED DESCRIPTION OF THE INVENTION

Figure 1:
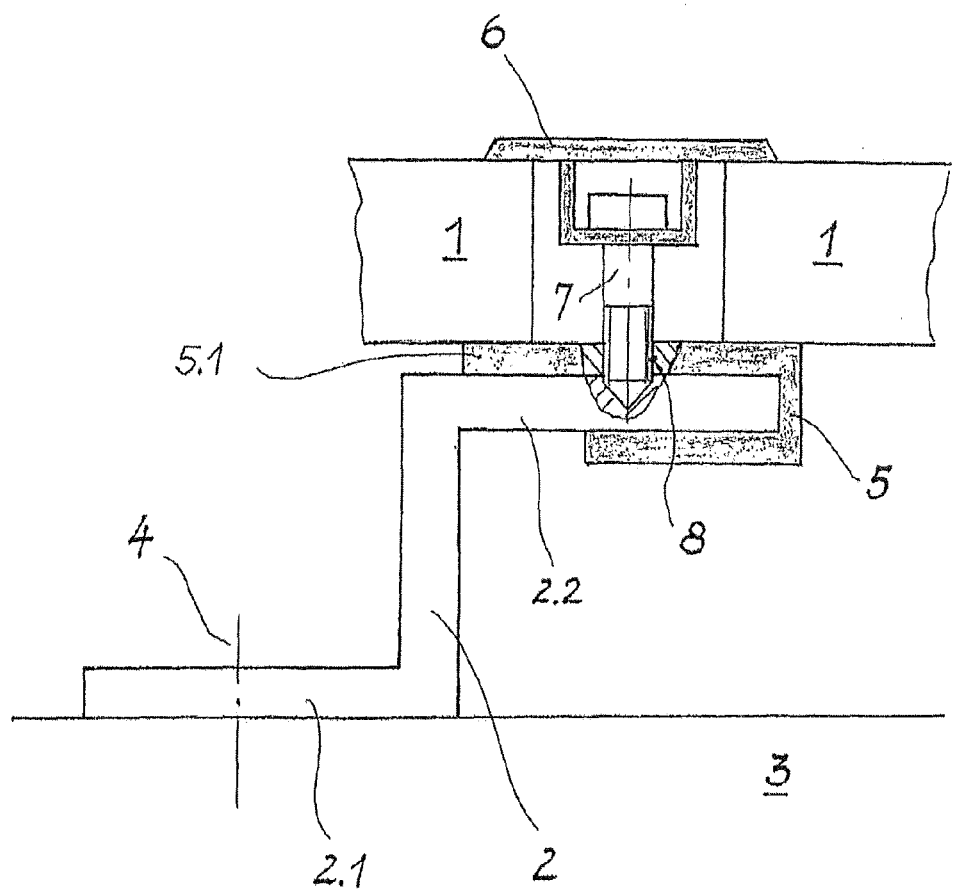
FIG. 1 depicts a first embodiment wherein a mounting bolt enters the Z leg of the Z-shaped support.
Figure 2:
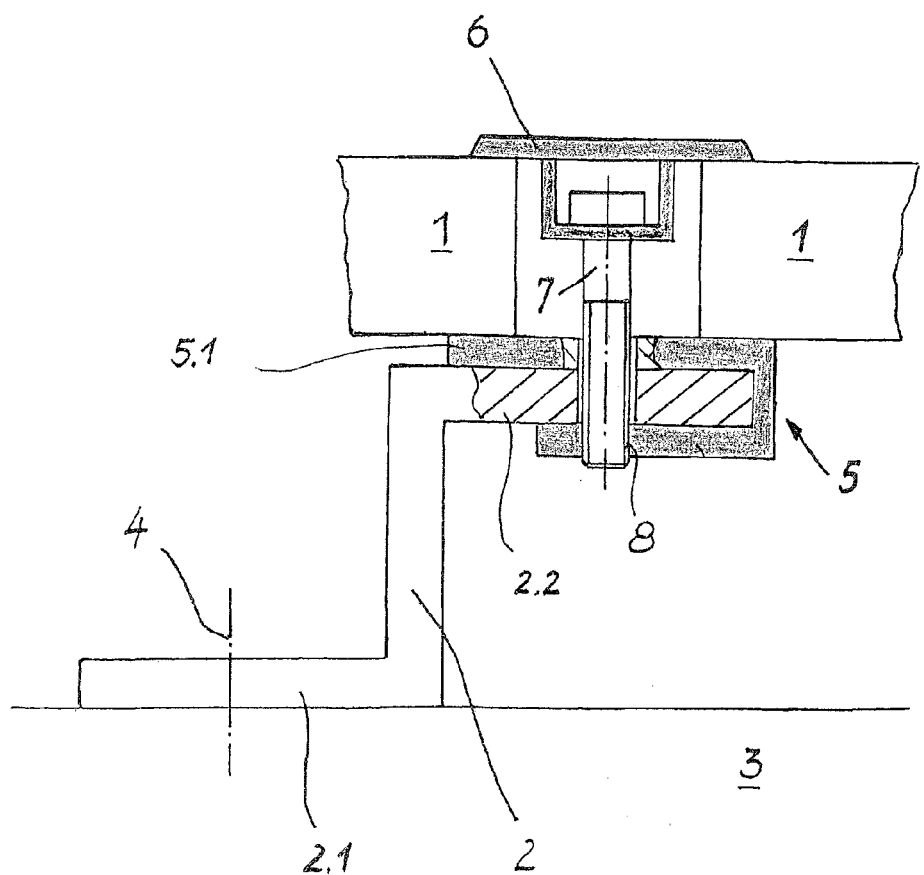
FIG. 2 depicts a second embodiment wherein a mounting bolt passes through both legs of a clamp as well as the Z leg of the Z-shaped support.

In a preferred embodiment, the clamps have a U-shaped cross-section, wherein the distance between the U legs is dimensioned such that the clamps can be slid onto the free Z leg of the Z-shaped support.

The upper leg of such clamps can serve as a rest for the solar panel frames, or the upper leg of the clamps is located between adjacent solar panel frames if the solar panel frames rest on the Z leg.

The clamps comprise at least one threaded bore in the upper leg, into which a mounting bolt can be screwed to fix the solar panel frame in position on or next to the clamps.

The mounting bolt or another suitable mounting means is dimensioned and designed to pass through the upper leg, i.e. the leg located on the side of the solar panel frame, of the clamp in each case and to enter or pass through the Z leg of the Z-shaped support when the solar panel frame is fixed in position, thus also fixing the clamp concerned in position on the Z leg.

Of course, as an alternative, both the clamp legs and the Z leg can comprise a bore through which a mounting bolt is passed once the bores are aligned, which bolt is then tightened by means of a nut.

In another embodiment, the threaded bore is arranged in the Z leg, and the U leg(s) of the clamp comprise(s) a bore for receiving the mounting bolt.

An embodiment where the solar panel frames rest on the upper leg of a clamp is shown in the drawing. The figure shows the Z-shaped support 2 which is arranged on the roof 3 by means of the Z leg 2.1 and the mounting means 4. The connective portion between the Z legs 2.1 and 2.2 of the Z-shaped support 2 is preferably at right angles with each of the Z legs 2.1 and/or 2.2. This ensures good access to the mounting means 4, and the stability characteristics of the Z-shaped support 2 are optimally used.

Several clamps 5 are slid onto the other Z leg 2.2 in the longitudinal direction of the support and at a distance from each other, the solar panel frames 1 resting on said clamps and mounting means engaging in said clamps to fix the solar panel frames 1 in position. The clamps 5 have a U-shaped cross-section, wherein the U legs are dimensioned such that the clamp 5 is securely held on the Z leg 2.2 and the solar panel frames 1 can rest on the upper leg 5.1 of the U-shaped clamp 5 in a stable manner in each case. If need be, the upper leg 5.1 can therefore have a leg height which is different from that of the lower U leg.

The clamp 5 shown in the figure comprises a threaded bore 8 in the upper leg 5.1 on which solar panel frames 1 rest, the mounting bolt 7 being screwed into said bore to fix the solar panel frames 1 in position on the clamp 5. The holder 6 presses the solar panel frames 1 against the clamp 5.

The mounting bolt 7 passes through the upper leg 5.1, i.e. the leg located on the side of the solar panel frame, of the clamp 5 and enters the Z leg 2.2. As a result, the clamp 5 as well as the solar panel frames 1 is/are fixed in position.

The proposed embodiment results in material savings of up to 20% compared to special profiles of the kind mentioned in the opening paragraph while the stability characteristics are the same.

LIST OF REFERENCE NUMERALS

1 Solar panel frame with solar cell module
2 Z-shaped support
   2.1 Leg of the Z-shaped support
   2.2 Leg of the Z-shaped support
3 Roof or roof hook
4 Mounting means
5 Clamp
   5.1 Upper leg of the clamp
6 Holder
7 Mounting bolt
8 Threaded bore

The invention claimed is:
1. A solar panel mount, comprising
   a Z-shaped support (2) comprising first and second legs (2.1, 2.2) and an intermediate segment, the first Z leg (2.1) of which is adapted to being mounted directly to the roof or connected to roof hooks or upright posts, clamps (5) having a U-shaped cross-section and comprising an upper leg (5.1) and a lower leg and adapted to receiving the second Z leg (2.2) between them, mounting means engaging in said clamps and adapted to fix solar panel frames (1) in position on one side of said clamps (5), wherein said mounting means comprise at least one mounting bolt (7) passing through at least the upper leg (5.1) of the clamp (5) and dimensioned to enter or pass through the Z leg (2.2) when fixing solar panel frames (1) in position.

2. A solar panel mount, comprising a Z-shaped support (2) comprising first and second legs (2.1, 2.2) and an intermediate segment, the first Z leg (2.1) of which is adapted to being mounted directly to the roof or connected to roof hooks or upright posts, clamps (5) having a U-shaped cross-section and comprising an upper leg (5.1) and a lower leg and adapted to receiving the second Z leg (2.2) between them, mounting means engaging in said clamps and adapted to fix solar panel frames (1) in position, wherein said mounting means comprise at least one mounting bolt (7) dimensioned to pass through at least the upper leg (5.1) of the clamp (5) and to enter or pass through the second Z leg (2.2) when fixing solar panel frames (1) in position, wherein (a) the upper legs (5.1) of the clamps (5) are adapted to serve as a rest for solar panel frames (1), or (b) the upper legs (5.1) of the clamps (5) are located between adjacent solar panel frames (1) when the solar panel frames (1) rest on the Z legs (2.2).

3. The solar panel mount according to claim 1, wherein the upper legs (5.1) comprise at least one threaded bore (8) into which a mounting bolt (7) can be screwed to fix at least one solar panel frame (1) in position on the clamp (5) or the second Z leg (2.2).

4. The solar panel mount according to claim 1, wherein at least one leg (5.1) of the clamp (5) comprises a bore through which a mounting bolt (7) is passed once the bores are aligned, which bolt can then be tightened by means of a nut.

5. The solar panel mount according to claim 1, wherein the Z leg (2.2) comprises a threaded bore (8) into which a mounting bolt (8) that is passed through a bore in the upper leg (5.1) of the clamp (5) can be screwed to fix solar panel frames (1) and the clamp (5) in position.

6. The solar panel mount according to claim 1, wherein the intermediate segment between the Z legs (2.1, 2.2) is at right angles with each of the Z legs (2.1) and 2.2.

7. A method for mounting a solar panel to a roof, the method comprising forming a Z-shaped support (2) comprising first and second legs (2.1, 2.2) and an intermediate segment, mounting the first Z leg (2.1) of Z-shaped support (2) directly to a roof or to roof hooks or upright posts, sliding onto the second Z leg (2.2) clamps (5) with a U-shaped cross-section and comprising an upper leg (5.1) and a lower leg and adapted to receiving the second ether Z leg (2.2) between them, and engaging mounting means in said clamps to fix a solar panel frame (1) in position, wherein said mounting means comprise at least one mounting bolt (7) passing through at least the upper leg (5.1) of the clamp (5) and entering or passing through the second Z leg (2.2) when fixing the solar panel frames (1) in position.

8. The solar panel mount according to claim 4, wherein both legs of the clamp (5) have a bore through which the mounting bolt (7) is passed once the bores are aligned.

9. The solar panel mount according to claim 4, wherein both legs of the clamp (5) and the second Z leg (2.2) have a bore through which the mounting bolt (7) is passed once the bores are aligned.

* * * * *